United States Patent

Stefina

(10) Patent No.: US 6,814,200 B2
(45) Date of Patent: Nov. 9, 2004

(54) CLUTCH ASSEMBLY HAVING ANTI-SKEW ENGAGEMENT MECHANISM

(75) Inventor: Brian K. Stefina, Waterford, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 15 days.

(21) Appl. No.: 10/310,229

(22) Filed: Dec. 5, 2002

(65) Prior Publication Data

US 2004/0016616 A1 Jan. 29, 2004

Related U.S. Application Data

(60) Provisional application No. 60/397,993, filed on Jul. 23, 2002.

(51) Int. Cl.[7] .............................................. F16D 41/16
(52) U.S. Cl. ................................................. 192/43.1
(58) Field of Search .......................... 192/43.1, 46, 47, 192/93 R, 43, 71; 180/233, 247, 248

(56) References Cited

U.S. PATENT DOCUMENTS

| | | | |
|---|---|---|---|
| 1,831,995 A | 11/1931 | Harney | |
| 2,173,044 A | 9/1939 | Ruggles et al. | 180/44 |
| 2,290,089 A | 7/1942 | Bock | 180/49 |
| 2,551,939 A | 5/1951 | Gerst | 192/48 |
| 2,887,201 A | 5/1959 | Willis | 192/67 |
| 2,906,383 A | 9/1959 | Gabriel | 192/85 |
| 2,969,134 A | 1/1961 | Wiedmann et al. | 192/84 |
| 3,481,436 A | 12/1969 | Wilkowski | 192/35 |
| 3,517,573 A | 6/1970 | Roper | 74/711 |
| 3,631,741 A | 1/1972 | Kelbel | 74/781 |
| 4,114,478 A | 9/1978 | Clauss | 74/781 |
| 4,407,387 A | 10/1983 | Lindbert | 180/247 |
| 5,152,726 A | 10/1992 | Lederman | 175/374 |
| 5,355,981 A | 10/1994 | Itoh et al. | 192/35 |
| 5,466,195 A | 11/1995 | Nogle et al. | 475/55 |
| 5,584,776 A | 12/1996 | Weilant et al. | 475/213 |
| 5,613,585 A * | 3/1997 | Tiede | 192/43.1 |
| 5,632,364 A * | 5/1997 | Mercat | 192/64 |
| 5,653,322 A | 8/1997 | Vasa et al. | 192/85 |
| 5,690,202 A * | 11/1997 | Myers | 192/46 |
| 5,704,867 A | 1/1998 | Bowen | 475/221 |
| 5,738,192 A * | 4/1998 | Miner | 192/43.1 |
| 5,918,715 A | 7/1999 | Ruth et al. | 192/46 |
| 5,992,592 A * | 11/1999 | Showalter | 192/43.1 |
| 6,149,543 A | 11/2000 | Breen | 475/269 |
| 6,202,813 B1 * | 3/2001 | Yahata et al. | 192/64 |

FOREIGN PATENT DOCUMENTS

WO  WO 99/45289  9/1999

* cited by examiner

Primary Examiner—Saul Rodriguez
(74) Attorney, Agent, or Firm—Bliss McGlynn, P.C.; Greg Dziegielewski

(57) ABSTRACT

A clutch assembly including an inner race, an outer race, and an engagement mechanism supported therebetween. The engagement mechanism includes a plurality of pockets and a corresponding plurality of pawls. Each pocket defines a leading edge, a trailing edge, and a ledge formed proximate the trailing edge and projecting toward the leading edge of the pocket. The pawls are moveably supported in a corresponding pocket between an engaged position that provides torque translation between the inner and outer races in one rotational direction and a disengaged position the interrupts torque translation between the inner and outer races in the one rotational direction. The ledge on each pocket acts to support the pawl so as to inhibit skewing as the pawls are moved between their engaged and disengaged positions.

19 Claims, 4 Drawing Sheets

CLUTCH ASSEMBLY HAVING ANTI-SKEW ENGAGEMENT MECHANISM

CROSS REFERENCE TO RELATED APPLICATIONS

This application claims the benefit of U.S. provisional patent application entitled "Bi-Directional Four-Mode Clutch," having Ser. No. 60/397,993, and filed on Jul. 23, 2002.

BACKGROUND OF THE INVENTION

1. Field of the Invention

The present invention relates, generally, to clutch assemblies and, more specifically, to a clutch assembly having an anti-skew engagement mechanism.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets, which may include an inner gear, intermediate planet or pinion gears which are supported by their carriers, and outer ring gears. Various components of the gear sets are held or powered to change the gear ratios in the transmission. In addition to such planetary gear sets, driveline components may further include multi-disc friction devices that are employed as clutches or brakes. The multi-disc pack clutch is a friction device that is commonly employed as a holding mechanism in a transmission, transfer case or differential or the like. In addition, multi-disc friction devices also find use in industrial applications, such as wet brakes, for example, to brake the wheels on earth-moving equipment.

The multi-disc pack clutch or brake assembly has a clutch sub-assembly including a set of plates and a set of friction discs that are interleaved between one another. The plates and friction discs are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction discs to come in contact with respect to one another. In certain applications, it is known to employ several multi-disc pack clutch devices in combination to establish different drive connections throughout the transmission, transfer case, or differential to provide various gear ratios in operation, or to brake a component.

When the discs are not engaged, there often remains a differential rotational speed of the drive and driven members which the clutch or brake bridges. Relative rotation between the friction discs and the plates during open-pack mode creates drag. This condition results in parasitic energy losses, reduces the efficiency of the transmission, transfer case or differential, and ultimately results in lower fuel efficiency.

In addition to multiple friction devices, one-way clutches are frequently employed in transmissions, transfer cases, and differentials to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. While this arrangement has worked well for its intended purpose, some disadvantages remain. For example, the friction clutch remains a source of significant parasitic losses due to inherent drag between the friction plates when the clutch is operating in "open pack" mode. Still, the clutch is necessary for providing the proper holding torque in low and reverse gears. Accordingly, there remains a need in the art for a mechanism that can provide the appropriate holding torque for both low and rear gears in the transmission and yet results in less parasitic losses which are presently attributable to the multiple plate friction clutch used for this purpose. In addition, there is a need in the art for a device that continues to perform the functions of the one-way clutch as described above, particularly where the output speed of the transmission exceeds the input speed resulting in engine compression braking.

One-way clutches have also been employed in transfer cases that provide full time, part time, and "on demand" four wheel drive (4WD) capabilities. In these situations, the one-way clutch is typically disposed between the primary driveline and the secondary driveline. When the primary drive line attempts to over speed the secondary drive line, as will occur, for example, where the rear wheel is supported on a slick surface, such as ice and is spinning and the front wheels are solidly supported, the one-way clutch engages and transfers torque to the slipping wheel. In this way, 4WD is achieved, but in this case, only under circumstances that require it.

The use of a one-way overrunning clutch to selectively provide drive torque to a secondary driveline upon primary wheel slip has not, however, become a popular solution to part time 4WD vehicle requirements because of one problem: the clutch remains disengaged or inactive when reverse gear is selected unless, of course, the secondary driveline attempts to over speed the primary driveline. Thus, in a situation frequently requiring 4WD, that is, when the vehicle may need to be rocked or simply backed over terrain, a 4WD configuration utilizing a one-way overrunning clutch will simply not provide 4WD operation. This is a significant drawback of this clutch configuration.

Partially in response to this problem, bi-directional overrunning clutches have been proposed in the related art for use in these circumstances. These bi-directional overrunning clutch assemblies typically employ an inner race, an outer race, and a plurality of rollers as the engagement mechanism disposed therebetween. The bi-directional overrunning clutches of the prior art are, for the most part, designed to be self-actuating. While they appear to present a solution to certain problems identified above they have not been widely employed in transmission, transfer cases, and differentials of the related art. These self-actuating bi-directional overrunning clutches are relatively mechanically complex and have certain physical limitations and drawbacks. One such drawback is that the existing bi-directional clutches have a large angular distance from the engagement in one rotational direction to the engagement in the opposite rotational direction. This makes for undesirable driving conditions by causing hard lockups when changing directions and also brings about a short mechanical life due to the severe inherent impact forces of the engagement. Additionally, the self-actuating bi-directional clutches known in the related art cannot be selectively engaged in an efficient manner or to optimize the vehicle power output in response to varying driving conditions.

Accordingly, there remains a need in the art for a bi-directional clutch that can be selectively actuated and controlled in a manner to provide driving comfort and offer efficient operating modes for various driving conditions while eliminating the need for conventional multi-disc friction devices. Furthermore, there remains a need in the art for a controllable bi-directional overrunning clutch assembly that can provide torque translation in either rotational direction as well as one that may be employed as a substitute for conventional multi-disc friction devices presently known in the related art. In addition, there also remains a need in the art for a bi-directional clutch assembly that can be effectively shifted between various operational modes without jamming of the engagement mechanism or other failures occurring at the interface between the inner and outer races of the clutch assembly.

SUMMARY OF THE INVENTION

The disadvantages of the related art are overcome in a clutch assembly of the present invention. The clutch assembly includes an inner race, an outer race and an engagement mechanism supported therebetween. The engagement mechanism includes a plurality of pockets and a corresponding plurality of pawls. Each pocket defines a leading end, a trailing end, and a ledge formed proximate to the trailing end and that projects toward the leading end of the pocket. Each of the pawls is moveably supported in a corresponding pocket between an engaged position in which the leading edge of the pawl engages the teeth to provide torque translation between the inner and outer races in one rotational direction and a disengaged position in which the leading edge of the pawl is disposed in non-contacting relationship with the teeth so as to interrupt torque translation between the inner and outer races in the one rotational direction. The ledge of the pocket acts to support the pawl so as to inhibit skewing as it is moved between its engaged and disengaged positions. In this way, the clutch assembly can be effectively shifted between various operational modes without jamming of the engagement mechanism or other failures occurring at the interface between the inner and outer races of the clutch assembly. Thus, this type of clutch assembly may be employed as a component of an automotive driveline in a transmission, transfer case, or differential to eliminate other components while maintaining the requisite functionality even when transitioning among its various operational modes.

Another advantage of the clutch assembly of the present invention is that when the clutch is used in connection with providing low and reverse gear ratios in a transmission, at least one multi-disc friction clutch and a one-way clutch may be eliminated. In this way, the clutch assembly of the present invention reduces parasitic energy loss, improves operational efficiency, and reduces cost.

Another advantage of the clutch assembly of the present invention is that the it may be employed in a transmission to provide the important engine braking effect that can occur when the speed of the transmission output shaft exceeds the speed of the input to any given planetary gear set.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 6:
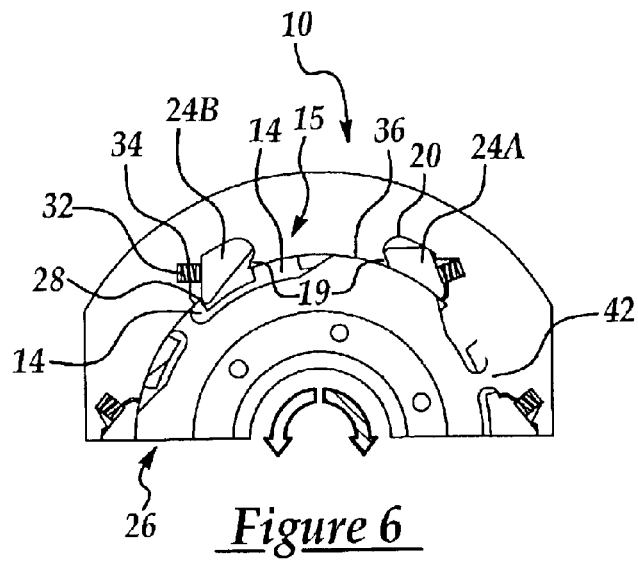
FIG. 6 is an enlarged partial side view of the clutch assembly of the present invention illustrating a third mode of operation where the positions of the sets of pawls are reversed so as to provide torque translation in the opposite rotational direction as illustrated in FIG. 5 but to allow freewheeling movement between the inner race and the outer race in the rotational direction opposite to that in which torque is translated in this mode.
Figure 7:
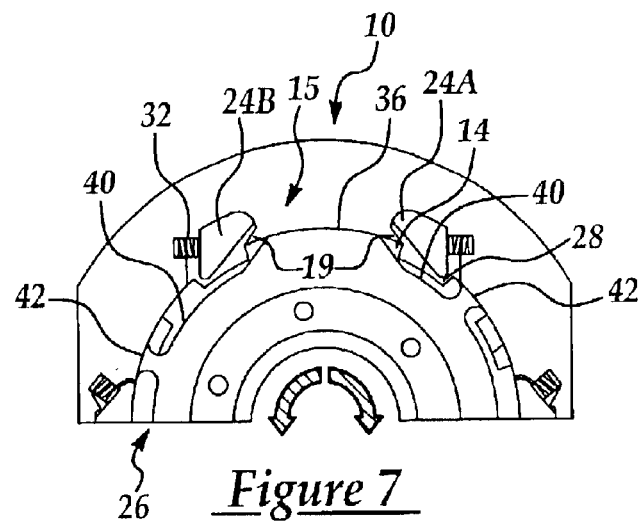
FIG. 7 is an enlarged partial side view of the clutch assembly of the present invention illustrating a fourth mode of operation wherein both sets of pawls are disposed in their engaged positions so that the inner and outer races are locked relative to each other and torque is translated in both rotational directions.
Figure 8:
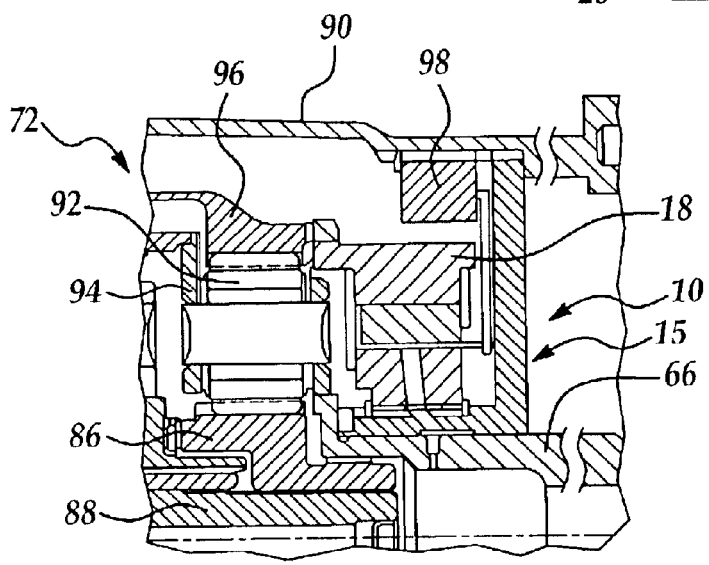
FIG. 8 is a schematic diagram depicting a transmission illustrating one possible use of the clutch assembly of the present invention in connection with providing low and reverse gear ratios.
Figure 9:
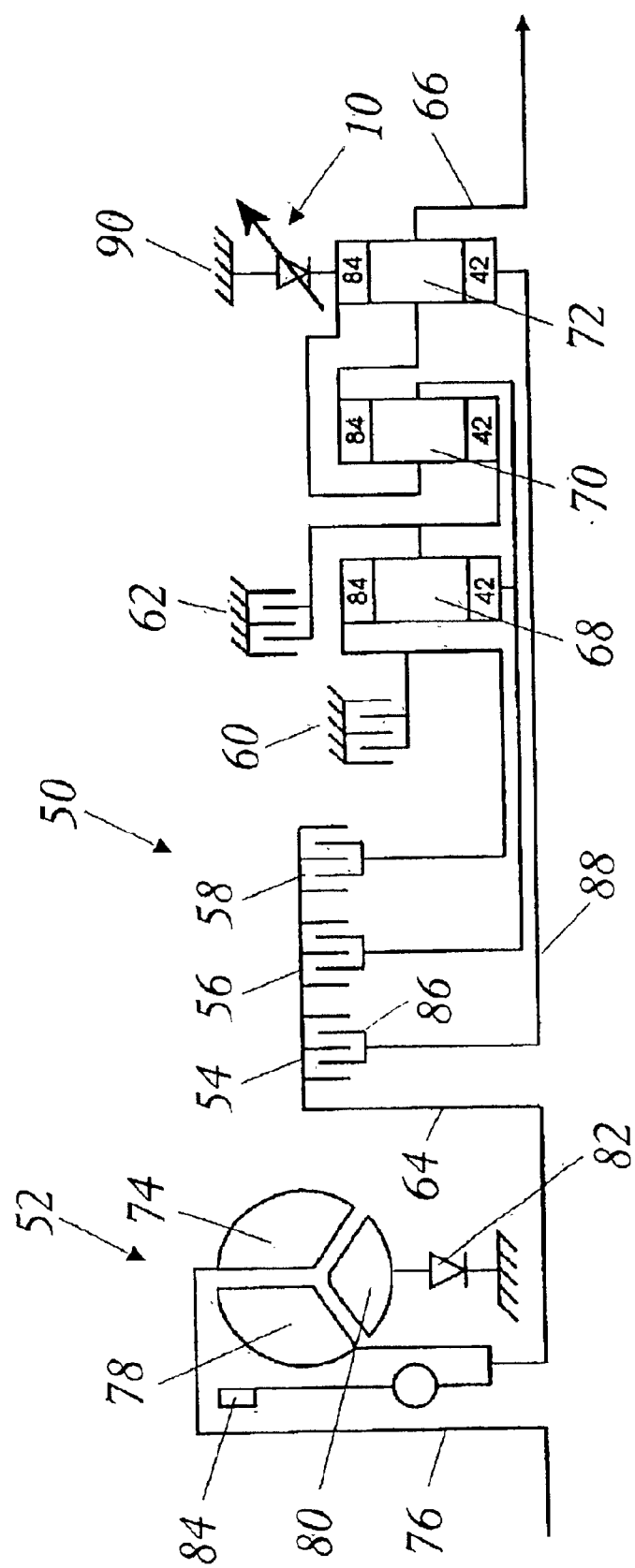
FIG. 9 is a schematic representation of a transmission that employs the clutch assembly of the present invention in conjunction with a planetary gear set of FIG. 8 to provide low and reverse gear ratios.

A clutch assembly of the present invention is generally indicated at 10 in FIGS. 1–7, where like numerals are used to designate like structure throughout the drawings. The various subcomponents of the clutch assembly 10 are illustrated in the exploded view of FIG. 1. In the preferred embodiment illustrated in these figures, the clutch assembly is bi-directional and overrunning and has four operational modes. These four modes are illustrated in the partial side views of FIGS. 4–7. The clutch assembly 10 is particularly adapted for use as a component of drivelines of land-based vehicles, such as in transmissions, transfer cases, differentials and the like. Accordingly, one application for the clutch assembly 10 of this particular type is shown in connection with a planetary gear set used to provide low and reverse gears in a transmission, as schematically illustrated in FIGS. 8 and 9. However, those having ordinary skill in the art will appreciate that the clutch assembly of the present invention may be employed in numerous applications, whether or not the application requires bi-directional functionality or takes advantage of all four operational modes of the clutch assembly as discussed below.

Figure 1:
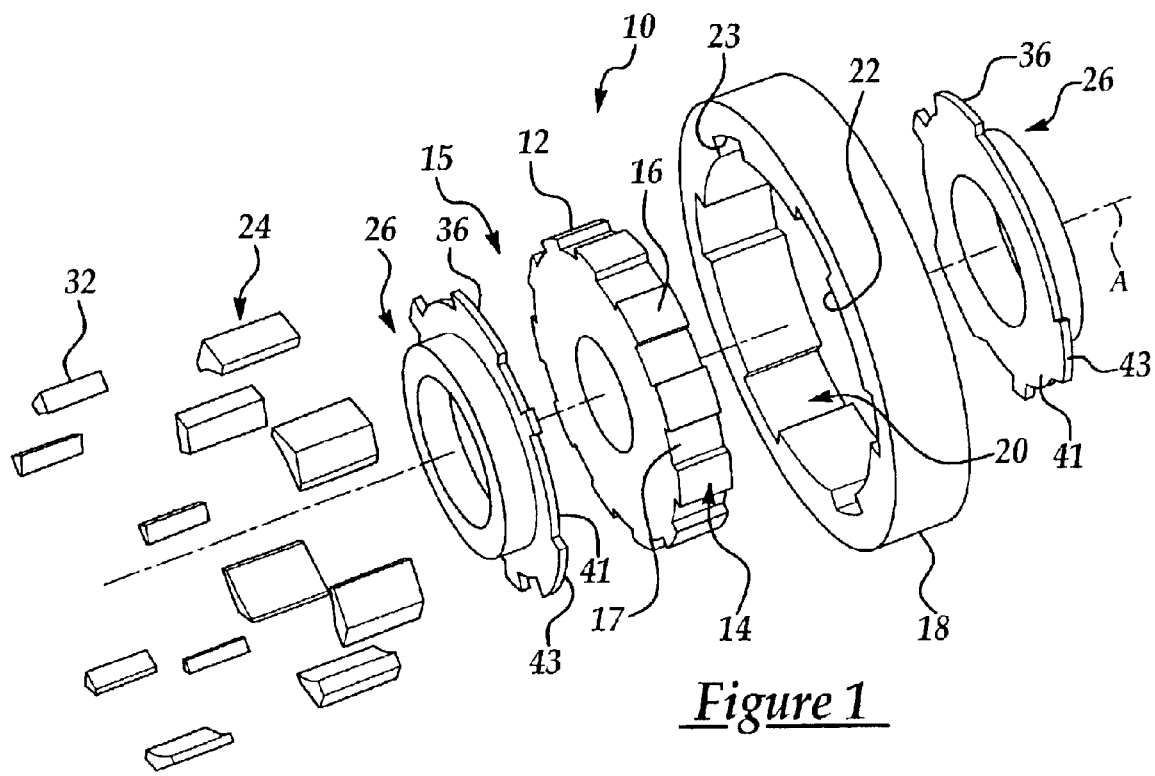
FIG. 1 is an exploded view of the clutch assembly of the present invention.

With continuing reference to FIG. 1, the clutch assembly 10 of the present invention includes an inner race, generally indicated at 12, an outer race, generally indicated at 18, and an engagement mechanism, generally indicated at 15, that is supported between the inner and outer races. The engagement mechanism 15 includes a plurality of pockets, generally indicated at 20 and a corresponding plurality of pawls, generally indicated at 24. In addition, the engagement mechanism includes a plurality of teeth, generally indicated at 14. In the preferred embodiment illustrated in figures, the teeth are formed on the outer circumference 16 of the inner race. On the other hand, the plurality of pockets are formed on the inner circumference 22 of the outer race. However, those having ordinary skill in the art will appreciate from the description that follows that the teeth may be formed on the outer race and the pockets may be formed on the inner race without departing from the scope of the present invention.

As noted above, and in one preferred embodiment, the clutch assembly 10 may be bi-directional. In this case, the plurality of pockets will include first and second sets of pockets 20A and 20B. Each pocket in a given set is located adjacent to a pocket from the other set. Furthermore, each pocket in the first set is oriented in an opposite direction relative to an adjacent pocket of the second set about the inner circumference of the outer race. Similarly, and in the case of a bi-directional clutch assembly 10, the plurality of pawls include first and second sets of pawls 24A and 24B. The two sets of pawls 24A and 24B correspond to the two sets of pockets 20A and 20B. Each of the pawls 24 is moveably supported in a corresponding set of pockets such that each pawl from the first set 24A is adjacent to a pawl from the second set 24B. In addition, each pawl 24A in the first set is oriented in an opposite direction relative to an adjacent pawl 24B from the second set. The first set of pawls 24A acts to translate torque between the inner and outer races in one rotational direction. This occurs when the first set of pawls are disposed in their engaged position. The second set of pawls 24B acts to translate torque between the inner and outer races in the opposite rotational direction when the second set of pawls 24B are disposed in their engaged position. The first set of pawls 24A may be designated as forward pawls. Engagement of the opposing, or second set of pawls 24B will allow for reverse movement and may therefore be designated as the reverse pawls. It should be appreciated that the designating of one of the two sets of pawls 24 as "first" or "forward" and the other set as "second" or "reverse" is merely a relative designation dependant on the application in which the clutch is employed (e.g. transmission or transfer case) and may relate to the relative rotational direction that achieves either a forward or reverse movement of the vehicle. Those having ordinary skill in the art will appreciate from the description that follows that the two sets of pawls 24A and 24B are identical and are supported about the inner diameter of the outer race so that adjacent pawls are opposed to one another to achieve the bi-directional function of the clutch. The specific structure of the pawls and pockets as well as the interaction of the engagement mechanism between the inner and outer races that provides this functionality will be discussed in greater detail below.

Figure 2:
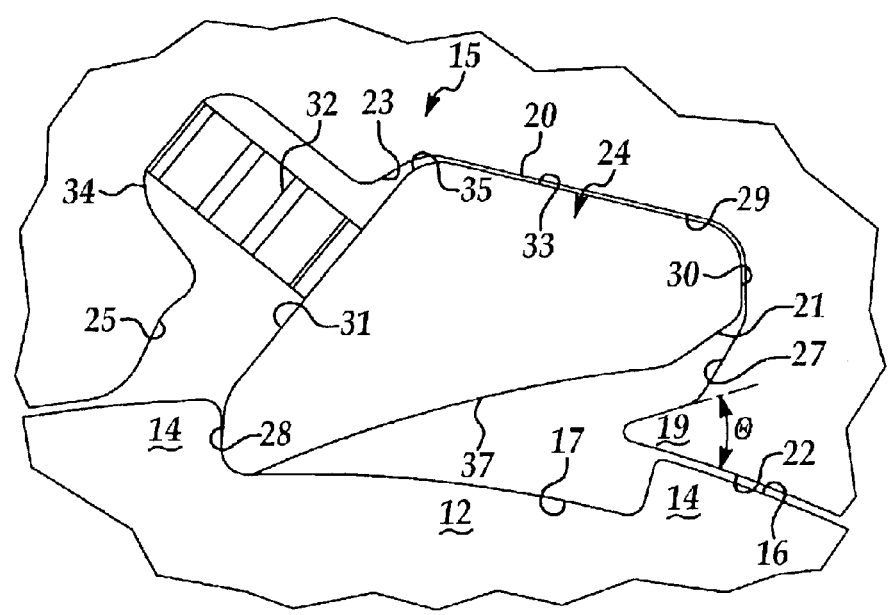
FIG. 2 is an enlarged side view of one portion of the engagement mechanism of the clutch assembly of the present invention illustrating the engaged position of one of the pawls.
Figure 3:
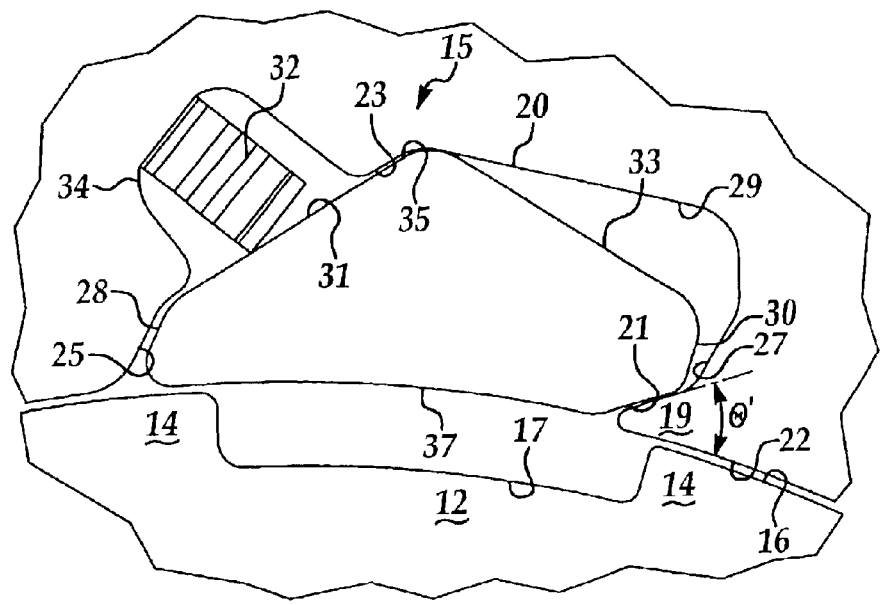
FIG. 3 is an enlarged side view of one portion of the engagement mechanism of the clutch assembly of the present invention illustrating the disengaged position of one of the pawls.

Referring now to FIGS. 2 and 3, additional details of the preferred embodiment of the engagement mechanism 15 will be addressed. More specifically, each pocket 20 in both the first and second sets defines a leading end 25, a trailing end 22, and a ledge 19. The ledge 19 is formed proximate to the trailing end 22 and projects toward the leading end 25 of the pocket 20. As will be described in greater detail below, the ledge 19 acts to support the pawl 24 so as to inhibit skewing as the pawl is moved between engaged and disengaged positions.

In addition, each of the plurality of pockets 20 in both sets of pockets 20A, 20B defines a ramp surface 27 located adjacent to the ledge 19. A back portion 29 is defined adjacent to the ledge 19 and a cradle portion 23 is defined between the back portion 29 and the leading end 25 of the pocket 20. An inner recess 34 is formed between the leading end 25 and the cradle portion 23. A biasing member 32 is supported within the inner recess 34 as will be described in greater detail below.

As alluded to above, each of the pawls 24 is moveably supported in a corresponding pocket 20 between an engaged position (FIG. 2) and a disengaged position (FIG. 3). When the pawls 24 are disposed in their engaged position, they provide torque translation between the inner and outer races in one rotational direction. On the other hand, when the pawls 24 are disposed in their disengaged position, torque translation between the inner and outer races is interrupted in the one rotational direction. To this end, each of the pawls 24 in both sets of pawls 24A, 24B includes a leading edge 28 and a trailing edge 30 formed on opposite sides of the pawls. The leading edge 28 of the pawls engages the teeth 14 defined on the outer circumference 16 of the inner race 12 so as to translate torque between the inner and outer races in one rotational direction when the pawls are in their engaged position. On the other hand, the leading edge 28 of the pawls is disposed in non-contacting relationship with the teeth 14 so that torque translation is interrupted between the inner and outer races when the pawls are in their disengaged position.

Each pawl 24 also includes a cam surface 21 that corresponds to the ledge 19 on the pocket 20 and that is supported by the ledge 19 when the pawl 24 is in its disengaged position as illustrated in FIG. 3. The cam surface 21 is adapted to slidingly move relative to the ledge 19 and the ramp surface 27 defined in the pocket 20 as the pawl 24 is moved from its disengaged position to its engaged position as illustrated in FIG. 2. The cooperative interaction between the ledge 19 and the cam surface 21 is further defined by the ledge 19 having an outward slope with a positive tangential angle ($\theta$) measured from the inner diameter 22 of the outer race 18. Likewise, the cam surface 21 also has an outward slope with a positive tangential angle ($\theta'$) measured from the inner diameter 22 of the outer race 18. More specifically, the tangential angle of the ledge ($\theta$) has an angular range of between 20 to 50 degrees with the angular difference between the tangential angle of the ledge ($\theta$) and the tangential angle of the cam surface (θ') having an angular range of 5 to 10 degrees as measured when the pawl 24 is in the retracted position (FIG. 3).

In addition, each pawl 24 also includes a top portion 33 that corresponds to the back portion 29 defined in each pocket. The top portion 33 is in contacting relationship with the back portion 29 of the pocket 20 when the pawl 24 is moved to its engaged position. A biased surface 31 is defined proximate to the leading edge 28 and a ridge portion 35 is defined between the biased surface 31 and the top portion 33 of the pawl. The biasing member 32 that is supported within the inner recess 34 of the pocket 20 acts on the biased surface 31 of the pawl to bias the pawl toward the engaged position as illustrated in FIG. 2. The ridge portion 35 on each pawl 24 is adapted to be generally received in the cradle portion 23 of the pocket 20 so as to facilitate pivotal movement of the pawl 24 between the engaged and disengaged positions. A bottom surface 37 extends between the leading edge 28 and the trailing edge 30 of the pawl opposite the top portion 33 and the biased surface 31. More specifically, the bottom surface 37 extends between the leading edge 28 and the cam surface 21 of each pawl 24.

Furthermore, while the pawls 24 may have any suitable geometric shape, as illustrated, for example, in FIGS. 2–7, the pawls 24 have a generally triangular shape when viewed from the side. The pawls 24 are supported in circumferentially spaced orientation about the rotational axis A of the clutch assembly 10. In addition, as best shown in FIG. 1, each pawl 24 defines a longitudinal axis that extends in the direction of the rotational axis A. In the preferred embodiment, the biasing member 32 is a Z-shaped spring having a longitudinal axis which corresponds to the longitudinal axis of the associated pawl 24 and is disposed within the inner recess 34 so as to be substantially parallel with the rotational axis A of the clutch assembly 10. However, those having ordinary skill in the art will appreciate that any number of biasing members known in the related art may be suitable for this purpose.

Figure 4:
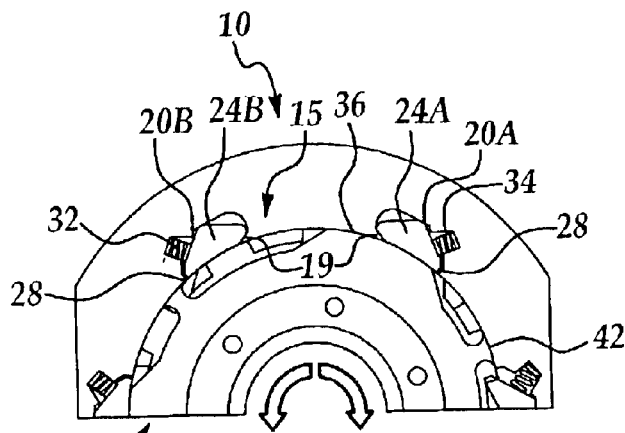
FIG. 4 is an enlarged partial side view of the clutch assembly of the present invention illustrating one mode of operation where both sets of pawls are disengaged such that the clutch may freewheel in both directions.

The clutch assembly 10 further includes an actuator cam, generally indicated at 26 that is associated with each set of pawls 24A and 24B. The actuator cam 26 serves to selectively move the pawls 24 in each set between their engaged and disengaged positions. More specifically, and in the case of a bi-directional clutch assembly, a pair of actuator cams 26 may be employed. Each one of the pair of actuator cams 26 is associated with a set of pawls 24 and is operable to move the pawls 24 in each set between their engaged and disengaged positions. In the preferred embodiment illustrated in these figures, the pair of actuator cams 26 are supported for incremental, coaxial movement on opposite sides of the inner and outer races of the clutch assembly 10. Each actuator cam 26 includes a flat disk 41 operatively supported for this coaxial, incremental movement with respect to the inner race 12. Furthermore, the flat disk-shaped actuator cam 26 has an irregular outer circumference 43 that defines a plurality of cam surfaces 36. Each cam surface 36 is adapted to engage an associated pawl 24 to move the pawl from its engaged position to its disengaged position. The actuator cam 26 is operable to actuate both the first and second sets of pawls 24 to selectively engage or disengage relative to the inner and outer races 12, 18, as the case may be. Each of the actuator cams 26 may be selectively indexed to bring one set of pawls 24 into an engaged or disengaged position. To this end, each cam surface 36 is spaced about the outer periphery of the actuator. The cam surfaces 36 are adapted to disengage every other pawl 24. Thus, when both actuators 26 are disposed in this orientation, they support each set of pawls 24A, 24B so that the leading edges of the pawls cannot engage the teeth 14 formed on the outer diameter 16 of the inner race 12. In this disposition, the clutch assembly 10 may freewheel in either rotational direction as indicated by the open rotation arrows (FIG. 4).

Figure 5:
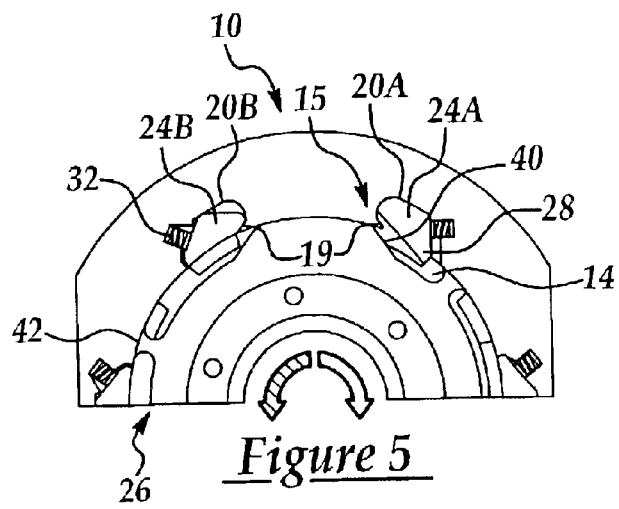
FIG. 5 is an enlarged partial side view of the clutch assembly of the present invention illustrating another mode of operation where one set of pawls is in the engaged position so as to provide torque translation between the inner and outer races in one direction and the other set of pawls is in the disengaged position to allow freewheeling movement of the inner and outer races relative to each other in the opposite rotational direction.

In addition, the actuator cams 26 include sloping portions 40. In the embodiment illustrated here, each cam surface 36 is formed between adjacent sloping portions 40. When a given actuator cam 26 is oriented such that the sloping portion 40 is disposed opposite a pawl 24, the pawl 24 moves in the direction of the outer diameter 16 of the inner race 12 and into engagement with one of the teeth 14 formed thereon. In this operative mode, torque is translated between the inner and outer races 12, 18 in one rotational direction or the other as illustrated in FIGS. 5 and 6. The open rotational arrows indicate freewheel movement and the crosshatched rotational arrows indicate engagement and torque translation. When the other actuator cam 26 is indexed so that its cam surfaces 36 are disposed opposite the respective pawls 24, the clutch assembly 10 will freewheel in the opposite rotational direction as illustrated in FIGS. 5 and 6. On the other hand, when the sloping portions 40 of both actuator cams 26 are disposed opposite a corresponding pawl 24, the leading edge of each pawl 24 is biased into engagement with a corresponding tooth 14 formed on the outer diameter 16 of the inner race 12. When both sets of pawls 24A and 24B are engaged in this manner, the inner and outer races 12, 18 are locked together and torque is translated in both rotational directions as illustrated in FIG. 7. Each actuator cam 26 may also include a plurality of outer rotational guides 42 located between adjacent sloping portions 40. The outer rotational guides 42 engage the inner radius 22 of the outer race 18 and thereby provide concentric stability of the actuator cams 26 relative to the outer race 18.

The actuator cam 26 controls the actuation of each set of pawls 24 so that they are properly positioned in either the engaged or disengaged positions. Thus, the actuator cam 26 is operable to (1) disengage the two sets of pawls 24A and 24B to provide freewheeling between the inner and outer races 12, 18 in both rotational directions (as shown in FIG. 4); (2) to actuate one set of the pawls 24A so that torque is translated in one rotational direction but to allow freewheeling in the opposite rotational direction as shown in FIG. 5; (3) to actuate the opposing set of pawls 24B as shown in FIG. 6 so that torque is translated in a direction opposite to that in mode (2) above, but allow freewheeling in the rotational direction opposite to that in which torque is translated in this mode; and (4) to actuate both set of pawls 24A and 24B so that the inner and outer races 12, 18 are locked relative to each other and torque is translated in both rotational directions (FIG. 7).

As will be clear from the discussion that follows, the bi-directional overrunning clutch assembly 10 having four operational modes may be employed in any number of applications to provide one or more of the four operational modes described above. For example, the clutch assembly 10 may be employed to eliminate a multi-disc friction clutch as well as other components that are commonly used in transmissions, transfer cases, and differentials. In this way, the clutch assembly 10 may result in a reduction of parasitic energy losses that are associated with the use of multi-plate friction disc clutches. When used in this way, the clutch assembly 10 thereby results in reduced weight and a concomitant reduction in cost in the associated driveline component.

One representative example of an advantageous use of the bi-directional overrunning clutch assembly having four operational modes of the present invention is shown in connection with a transmission, schematically illustrated at 50 in FIG. 9. The transmission 50 has a number of conventional components that are arranged to translate torque between a prime mover, such as an internal combustion engine (not shown) and the output of the transmission at various gear ratios. However, those having ordinary skill in the art will appreciate that the standard components of a transmission may be arranged in numerous ways to provide various gear ratios.

To this end, the transmission 50 includes a torque converter, generally indicated at 52, and a plurality of multi-plate friction disc clutches 54, 56, 58, 60, 62 or similar mechanisms that serve as holding mechanisms or brakes to translate torque between the primary transmission input shaft 64 and the primary transmission output shaft 66 acting through a plurality of planetary gear sets 68, 70, and 72, as is commonly known in the art. The torque converter 52 includes an impeller assembly 74 operatively connected for rotation with the torque input member 76 from the internal combustion engine, a turbine assembly 78 fluidly connected in driven relationship with the impeller assembly 74 and a stator assembly 80. These assemblies together form a substantially toroidal flow passage for kinetic fluid in the torque converter 52. Each assembly includes a plurality of blades or vanes that act to convert mechanical energy into hydrokinetic energy and back to mechanical energy. The stator assembly 80 of a conventional torque converter is locked against rotation in one direction but is free to spin about an axis in the direction of rotation of the impeller assembly 74 and the turbine assembly 78. A one-way clutch 82 is often employed for this purpose. When the stator assembly 80 is locked against rotation, the torque is multiplied by the torque converter. During torque multiplication, the output torque is greater than the input torque for the torque converter 52. In addition, conventional torque converters often employ clutches 84 interposed between the torque input member 76 and the turbine assembly 78 which are engaged and "lock up" at higher speed ratios (speed output/speed input). When the clutch 84 is locked up, there is a direct torque translation between the torque input member 76 and the transmission 50 through the turbine assembly 78.

In the particular transmission 50 illustrated in FIG. 9, an underdrive clutch 54, overdrive clutch 56, reverse clutch 58, fourth gear brake 60, and second gear brake 62 are employed as holding mechanisms to translate torque from the primary transmission input shaft 64 to various ones of the planetary gear sets 68, 70, and 72, as the case may be. In turn, each of the planetary gear sets include a sun gear operatively coupled to one of the clutches identified above, a ring gear disposed about the respective sun gear, and a plurality of pinion or planetary gears disposed in meshing relationship between the respective sun and ring gears. In this case, torque is provided from the underdrive clutch 54 to the sun gear 86 that is splined to the shaft 88. To control the bi-directional clutch 10, the actuator cams 26 are indexed to one of the modes illustrated in FIGS. 4–7 via an actuator (electromagnetic, hydraulic, or otherwise) that is schematically illustrated at 98 in FIG. 8.

In the representative embodiment illustrated herein, the bi-directional overrunning clutch assembly 10, as controlled by the present invention, is employed in connection with the planetary gear set 72 that is used to provide low and reverse gear ratios. The physical application is schematically illustrated in FIG. 8. When in Drive and low (or first) gear, the clutch 10 functions as a forward driving one-way overrunning clutch by having only the forward pawls 24A engaged. When in Drive and any higher gear, both sets of pawls 24 are disengaged so that it efficiently freewheels in both directions. When in Reverse gear, both sets of pawls 24 are engaged so that the reverse pawls 24B drive the vehicle in reverse and the forward pawls 24A provide coast braking. In manually selected first gear, the clutch 10 may initially have both sets of pawls 24 engaged so that the forward pawls 24A drive the vehicle with the reverse pawls 24B providing coast braking up to a predetermined speed at which time the coast breaking reverse pawls 24B are disengaged.

Physically, the actuator cams 26 will be indexed to the mode illustrated in FIG. 5 via an actuator, which is schematically illustrated at 98 in FIG. 8. In this operational mode, the clutch 10 translates torque in one direction relative to a forward movement of the vehicle, while allowing freewheeling in the opposite rotational direction.

The reverse pawls 24B provide reverse resistance in low speed or short distance situations such as garage and parking movements, while disengaging when proceeding in forward driving situations. This overcomes the drawbacks of the conventionally employed multi-disc friction clutches (that it replaces) or the conventional one-way clutches commonly employed for this purpose by avoiding the parasitic losses and the resultant reduction in fuel efficiency from the constant friction and mechanical contact of the multi-disc friction clutches or over-running one-way clutches.

In all automatic forward shifts, other than the two mentioned in detail above, the forward and reverse pawls 24B are disengaged and not forced to overrun and drag on the inner race. This is depicted in the cross-section illustration of the bi-directional clutch in FIG. 4, that shows that both of the actuation cams 26 are indexed to disengage both sets of pawls 24 so that the clutch 10 freewheels in both rotational directions when in the higher gears (i.e. 2nd and above).

Both the forward pawls 24A and the reverse pawls 24B of the bi-directional clutch 10 may be engaged prior to attempting to provide torque in reverse gear so that the reverse pawls 24B are used to drive the vehicle and the forward pawls 24A are used for coast breaking. This is depicted in the cross-section illustration of the bi-directional overrunning clutch 10 in the mode illustrated in FIG. 7 wherein both sets of pawls 24 are locked to provide torque translation in either direction.

Thus, in addition to reducing parasitic losses, the bi-directional overrunning clutch assembly 10 is employed in connection with low and reverse gears to provide an important engine braking function. This also occurs in the manually selected first gear when the forward pawls 24A, are engaged and the operator has his foot in the throttle of the internal combustion engine, as representatively illustrated in FIG. 7. In this operative mode, torque is translated from the inner race 12 to the transmission case 90. However, in a "lift foot" condition, the inner race 12 shifts and the reverse pawls 24B are engaged. In this operative mode, the wheels of the automobile drive through the transmission providing torque to the engine. The engine thus acts as a brake on the vehicle.

In this way, the bi-directional clutch assembly of the present invention provides four separate modes of operation between the inner and outer races of the clutch assembly. More specifically, the actuator is controlled to operatively (1) disengage the pawls to provide freewheeling between the inner and outer races in both rotational directions (as shown in FIG. 4); (2) to actuate the pawls so that torque is translated in one rotational direction but to allow freewheeling in the opposite rotational direction as shown in FIG. 5; (3) to actuate the pawls so that torque is translated in a direction opposite to that in mode (2) above, but allow freewheeling in the rotational direction opposite to that in which torque is translated in this mode (FIG. 6); and (4) to actuate the pawls so that the inner and outer races are locked relative to each other and torque is translated in both rotational directions as shown in FIG. 7.

Thus, the bi-directional overrunning clutch assembly provides four distinct modes as illustrated in FIGS. 4–7. This type of bi-directional overrunning clutch assembly having four operational modes may be employed as a component of an automotive driveline in a transmission, transfer case, or differential to eliminate other components while maintaining the requisite functionality when controlled by the present invention. When the clutch is used in connection with providing low and reverse gear ratios in the representative transmission illustrated in FIG. 9, at least one multi-disc friction clutch and a one-way clutch may be eliminated. In this way, the control of the clutch assembly by the present invention reduces parasitic energy loss, improves operational efficiency, and reduces cost. In addition, the clutch may be employed in a transmission to provide the important engine braking effect that can occur when the speed of the transmission output shaft exceeds the speed of the input to any given planetary gear set.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

What is claimed is:

1. A clutch assembly comprising:
   an inner race, an outer race, and an engagement mechanism supported therebetween;
   said engagement mechanism including a plurality of pockets and a corresponding plurality of pawls, each pocket defining a leading end, a trailing end, a ledge formed proximate said trailing end and projecting toward said leading end of said pocket, and a ramp surface adjacent to said ledge;
   each of said pawls moveably supported in a corresponding pocket between an engaged position so as to provide torque translation between said inner and outer races in one rotational direction and a disengaged position so as to interrupt torque translation between said inner and outer races in the one rotational direction, each of said plurality of pawls including a cam surface that corresponds to said ledge on said pocket and that is supported by said ledge when said pawl is in a disengaged position;
   said ledge of said pocket acting to support said pawl so as to inhibit skewing as it is moved between said engaged and disengaged positions with said cam surface on each pawl adapted to slidingly move relative to said ledge and said ramp surface as said pawl is moved from said disengaged position to said engaged position.

2. A clutch assembly as set forth in claim 1 wherein each of said plurality of pockets further defines a back portion adjacent to said ledge and a cradle portion defined between said back portion and said leading end of said pocket, each of said plurality of pawls including a top portion that corresponds to said back portion and that is in contacting relationship with said back portion when said pawl is moved to its engaged position.

3. A clutch assembly as set forth in claim 2 wherein said engagement mechanism further includes a plurality of teeth, each of said pawls includes a leading edge and a trailing edge formed on opposite sides of each pawl, said leading edge of said pawls engaging said teeth to translate torque between said inner and outer races in one rotational direction when said pawls are in said engaged position, and said leading edge of said pawls disposed in non-contacting relationship with said teeth so as to interrupt torque translation between said inner and outer races when said pawls are in said disengaged position.

4. A clutch assembly as set forth in claim 3 wherein each of said plurality of pawls includes a biased surface defined proximate said leading edge and a ridge portion defined between said biased surface and said top portion of said pawl, said ridge portion adapted to be generally received in said cradle portion of said pocket for facilitating pivotal movement of said pawl between said engaged and disengaged positions.

5. A clutch assembly as set forth in claim 4 wherein each of said plurality of pockets further includes an inner recess formed between said leading end and said cradle portion, a biasing member supported within said inner recess and acting on said biased surface to bias said pawl toward said engaged position.

6. A clutch assembly as set forth in claim 5 wherein each of said plurality of pawls includes a bottom surface extending between said leading edge and said trailing edge opposite said top portion and said biased surface of said pawl.

7. A clutch assembly as set forth in claim 6 wherein said bottom surface extends between said leading edge and said cam surface of each of said pawls.

8. A clutch assembly as set forth in claim 1 wherein said engagement mechanism includes a plurality of teeth formed on the outer circumference of said inner race and said plurality of pockets are formed on the inner circumference of said outer race.

9. A clutch assembly as set forth in claim 8 wherein said plurality of pockets includes first and second sets of pockets where each pocket in said first set is located adjacent to a pocket from the said second set and each pocket in said first set is oriented in an opposite direction relative to an adjacent pocket of said second set about the inner circumference of the outer race.

10. A clutch assembly as set forth in claim 9 wherein said plurality of pawls includes first and second sets of pawls corresponding to said first and second sets of pockets, each of said pawls being moveably supported in a corresponding set of pockets such that each pawl from said first set is adjacent to a pawl from said second set and such that each pawl in said first set is oriented in an opposite direction relative to an adjacent pawl from said second set and wherein said first set of pawls acts to translate torque between said inner and outer races in one rotational direction when said first set of pawls are disposed in their engaged position and the said second set of pawls acts to translate torque between said inner and outer races in the opposite rotational direction when said second set of pawls are disposed in their engaged position.

11. A clutch assembly as set forth in claim 10 wherein said ledge is further defined by having an outward slope with a positive tangential angle ($\theta$) measured from the inner diameter of said outer race.

12. A clutch assembly as set forth in claim 11 wherein said tangential angle ($\theta$) of said ledge has a range of 20 to 50 degrees.

13. A clutch assembly as set forth in claim 12 wherein said cam surface is further defined by having an outward slope with a positive tangential angle (θ') measured from the inner diameter of said outer race.

14. A clutch assembly as set forth in claim 13 wherein said tangential angle of said ledge (θ) and said tangential angle of said cam surface (θ') have an angular difference in a range of 5 to 10 degrees as measured when said pawl in said retracted position.

15. A clutch assembly as set forth in claim 14 wherein said clutch assembly further includes an actuator associated with each set of pawls for selectively moving said first and second set of pawls between said engaged and disengaged positions.

16. A clutch assembly as set forth in claim 15 wherein said actuator includes a flat disk operatively supported for coaxial incremental movement with respect to said inner race and having an irregular outer circumference that defines a plurality of cam surfaces, each cam surface adapted to engage an associated pawl in a corresponding set of pawls to move said pawl from said engaged position to said disengaged position.

17. A clutch assembly as set forth in claim 15 wherein said actuator includes a pair of actuators, each one of said pair of actuators associated with a set of pawls and operable to move said pawls in each set between said engaged and disengaged positions.

18. A clutch assembly as set forth in claim 17 wherein said pair of actuators are supported for incremented coaxial movement on opposite sides of said inner and outer races of said clutch assembly.

19. A bi-directional overrunning clutch assembly comprising:

an inner race, an outer race, and an engagement mechanism supported therebetween;

said engagement mechanism including a plurality of teeth formed on the outer circumference of said inner race, first and second sets of pockets formed on the inner circumference of said outer race and first and second sets of pawls corresponding to said first and second sets of pockets;

each pocket in both sets of pockets defining a leading end, a trailing end, a ledge formed proximate said trailing end and projecting toward said leading end of said pocket, and a ramp surface adjacent to said ledge, each pocket in said first set is located adjacent to a pocket from said second set and each pocket in said first set is oriented in an opposite direction relative to an adjacent pocket of said second set about the inner circumference of said outer race;

each of said pawls including a leading edge and a trailing edge formed on opposite sides of each pawl as well as a cam surface that corresponds to said ledge on said corresponding pocket, each of said pawls in said first and second sets of pawls being moveably supported in a corresponding set of pockets such that each pawl from said first set is adjacent to a pawl from said second set and such that each pawl is oriented in an opposite direction relative to an adjacent pawl and wherein said first set of pawls acts to translate torque between said inner and outer races in one rotational direction when said first set of pawls are disposed in their engaged position such that said leading edge of said first set of pawls engages said teeth formed on the outer circumference of said inner race and said second set of pawls acts to translate torque between said inner and outer races in the opposite rotational direction when said second set of pawls are disposed in their engaged position such that said leading edge of said second set of pawls engages said teeth formed on the outer circumference of said inner race, said cam surface of each pawl in said first and second sets of pawls being supported by a corresponding ledge in said first and second set of pockets and said leading edge of each pawl in said first and second set of pawls disposed in non-contacting relationship with said teeth so as to interrupt torque translation between said inner and outer races when said first and second set of pawls are in said disengaged positions; and an actuator associated with each set of said pawls for selectively moving the pawls in each set between said engaged and disengaged positions, said ledge of said first and second sets of pockets acting to support each pawl of said first and second sets of pawls proximate said trailing edge so as to inhibit skewing with said cam surface on each nawl adapted to slidingly move relative to said corresponding ledge and said ramp surface as each pawl is moved between said engaged and disengaged positions.

* * * * *